United States Patent [19]

Takahashi

[11] Patent Number: 4,672,816
[45] Date of Patent: Jun. 16, 1987

[54] COOLING SYSTEM WITH DEVICE FOR PREVENTING A BAD ODOR FROM CIRCULATING

[75] Inventor: Tadahiro Takahashi, Konan, Japan

[73] Assignee: Diesel Kiki Co., Ltd., Tokyo, Japan

[21] Appl. No.: 768,231

[22] Filed: Aug. 22, 1985

[30] Foreign Application Priority Data

Aug. 24, 1984 [JP] Japan .......................... 59-128459[U]

[51] Int. Cl.$^4$ .............................................. F25D 17/00
[52] U.S. Cl. ..................................... 62/180; 62/228.4; 62/228.5
[58] Field of Search ...................... 62/180, 182, 228.4, 62/228.5, 163, 161

[56] References Cited

U.S. PATENT DOCUMENTS 4,407,139  10/1983  Ide et al. ..................... 62/228.4 X
4,480,443  11/1984  Nishi et al. .................. 62/228.5 X Primary Examiner—Harry Tanner
Attorney, Agent, or Firm—Wenderoth, Lind & Ponack

[57] ABSTRACT

A cooling system includes a circuit for the adjusting of the capacity of a compressor of a refrigeration cycle, and a circuit for stopping a blower until an evaporator of the refrigeration cycle is substantially dewed after the starting of the compressor and a circuit for driving the compressor at the maximum capacity until the blower has begun to be driven. The evaporator is cooled quickly because the compressor is driven at its maximum capacity, so that the time of the stoppage of the blower can be short while preventing a bad odor from circulating.

4 Claims, 3 Drawing Figures

4,672,816

COOLING SYSTEM WITH DEVICE FOR PREVENTING A BAD ODOR FROM CIRCULATING

BACKGROUND OF THE INVENTION

1. Field of the Invention

The present invention relates to a cooling system for an automobile etc., and more particularly to a cooling system equipped with a device for preventing a bad odor from circulating after starting.

2. Description of the Prior Art

In a cooling system which has a refrigeration cycle with a compressor and an evaporator, and a blower for supplying air to the evaporator of the refrigeration cycle, it is widely known that air with a bad odor due to dust clinging to the evaporator is circulated into a room if the blower is rotated immediately after the starting of the compressor. Devices for preventing such bad odor from circulating have been disclosed in Japanese Utility Model Publication (KOKOKU) No. 55-44652 and Japanese Utility Model Publication (KOKOKU) No. 56-1447, for example. In the device disclosed in the former, first and second thermoswitches are provided on or near the evaporator. The compressor is turned on and off by the first thermoswitch so as to be at a temperature in the vicinity of the freezing temperature. The compressor is then controlled by the second thermoswitch instead of the first thermoswitch, after the starting of the cooling system, so as to drive the compressor to a temperature lower than the freezing temperature, and so as to stop the operation of the blower throughout the period of the drive of the compressor to sufficiently dew the evaporator to prevent the flying-away of the odor molecules clinging to the evaporator. In the device disclosed in the latter, a single thermoswitch is provided so as to drive the compressor to the vicinity of the freezing temperature, regardless of a set temperature, at the first action of the thermoswitch to produce the same effect as mentioned above.

In both prior art devices mentioned above, the temperature at which the compressor is turned on and off is only lowered at the time of the starting of the cooling system, and the capacity of the compressor is not changed. For that reason, the speed of the cooling of the evaporator is low. As a result, the time of the stoppage of the blower is long, and the hot environment at the time of the starting of the cooling system lasts for a long time, and the cooling speed of the system is low.

SUMMARY OF THE INVENTION

It is accordingly an object of the present invention to provide a cooling system which can solve the above-mentioned problems. More specifically, the speed of the cooling of the evaporator is increased at the time of the starting of the cooling system to shorten the time of the stoppage of the blower to quickly cool a room while preventing a bad odor from circulating.

According to the present invention, there is indicated a cooling system comprising a refrigeration cycle having a compressor and an evaporator, and is equipped with a means for adjusting the capacity of the compressor, and a means for stopping the blower until the evaporator is substantially dewed after starting the compressor, and a means for driving the compressor at maximum capacity under the action of the adjusting means until the stoppage of the blower is nullified under the action of the stop means. The r.p.m. or discharge volume of the compressor can be changed by the adjusting means. The stop means can be provided with a manual switch for enabling it to stop the blower or disabling it so as not to stop it at all.

Consequently, after starting the cooling system, the blower is stopped by the stop means and the compressor is driven at the maximum capacity by the driving means until the evaporator is substantially dewed. As a result, the speed of the cooling of the evaporator is maximized, so that the problems are solved.

Many other advantages and features of the present invention will become manifest to those versed in the art upon making reference to the detailed description and the accompanying drawings in which preferred structural embodiments incorporating the principles of the present invention are shown by way of illustrative example.

DETAILED DESCRIPTION OF THE INVENTION

Figure 1:
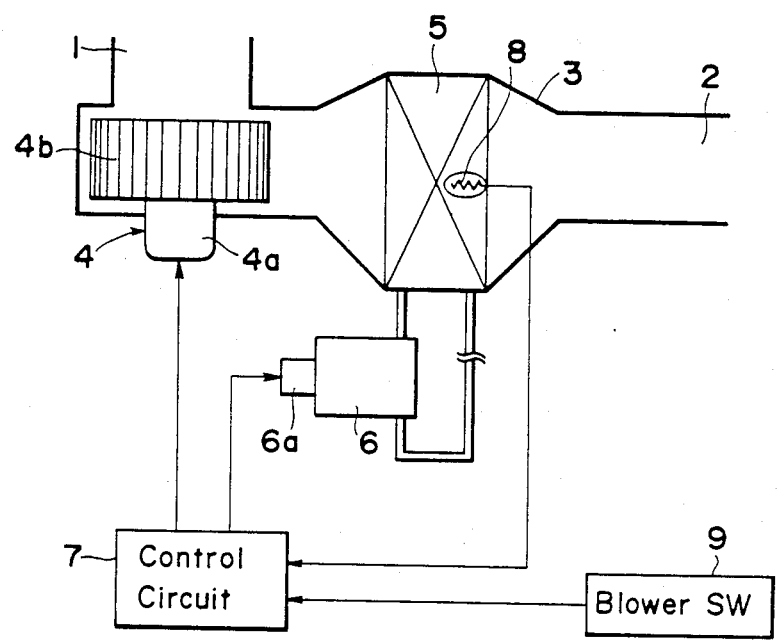
FIG. 1 is a schematic view of a cooling system which is an embodiment of the present invention.

FIG. 1 shows a cooling system having an air duct 3 which is provided with an air inlet port 1 and an air outlet port 2. A blower 4 and an evaporator 5 are disposed in the air duct 3. When electricity is applied to the motor 4a of the blower 4, its fan 4b is rotated to introduce air into the air duct 3 through the air inlet port 1 and to blow of the air into a room through the evaporator 5 and the air outlet port 2. The evaporator 5 and a compressor 6 constitute a conventional refrigeration cycle. A coolant flowing in the refrigeration cycle is evaporated to perform a heat exchange with the air passing through the evaporator 5 so as to cool the air. The compressor 6 includes a motor 6a, by which the r.p.m. of the compressor is adjusted. The motor 4a of the blower 4 and that 6a of the compressor 6 are controlled by output signals of a control circuit 7. The control circuit 7 receives signals from a blower switch 9 and a temperature sensor 8 which detects the temperature of the evaporator 5.

Figure 2:
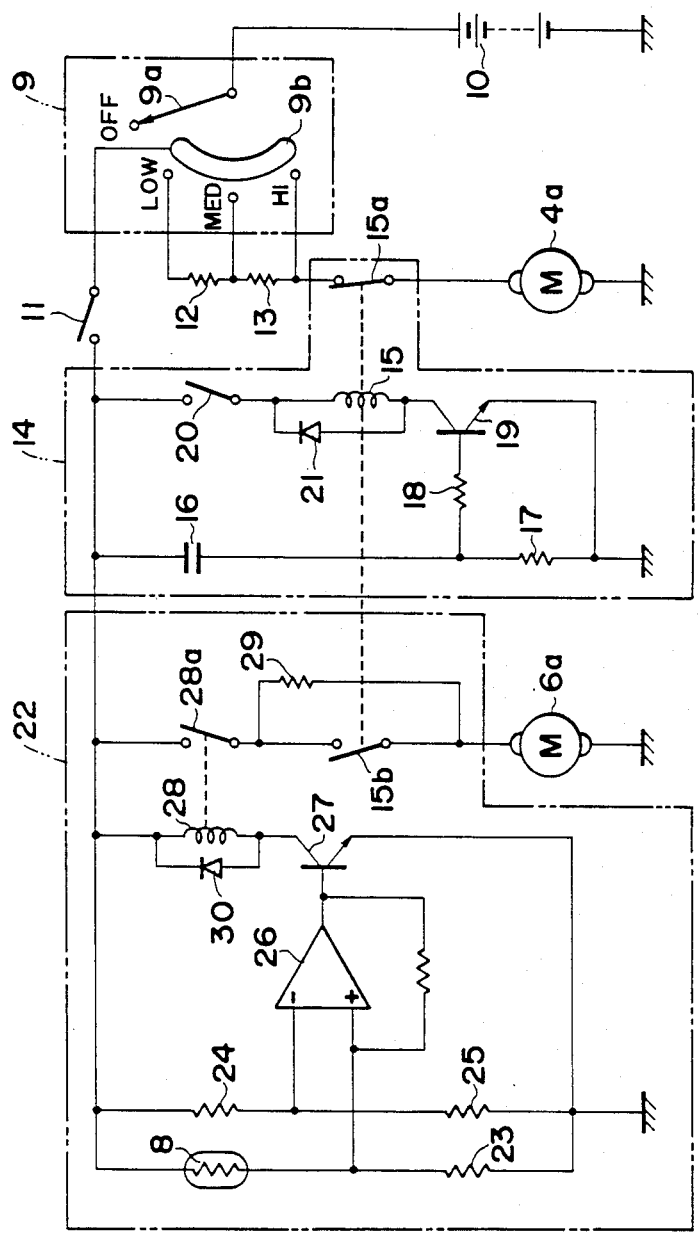
FIG. 2 is an electric circuit of a control circuit of the cooling system.

FIG. 2 shows the electric circuitry including the control circuit 7. The blower switch 9 is connected to the positive terminal of a power supply unit 10 such as a battery. The blower switch 9 comprises a movable contact 9a, and a common contact 9b and four fixed contacts OFF, LOW, MED and HI. The common contact 9b is connected to one terminal of a main switch 11. The fixed contact OFF is connected to nowhere. The fixed contact LOW is connected to one terminal of a series circuit consisting of resistors 12 and 13 used for controlling the r.p.m. of the blower 4. The fixed contact MED is connected to the middle point of the series circuit of the resistors 12 and 13. The fixed contact HI is connected to other terminal of the series circuit. The latter terminal of the series circuit is connected to a positive terminal of the motor 4a of the blower 4 via a normally closed contact 15a, which is opened and closed via a first relay coil 15 in a circuit 14 used for controlling the blower 4 at the time of the starting of the system. The negative terminal of the motor 4a is grounded.

The circuit 14 has a timer comprising a capacitor 16 and resistors 17 and 18. The positive terminal of the capacitor 16 is connected to the main switch 11. One terminal of the resistor 17, whose other terminal is connected to the negative terminal of the capacitor 16, is grounded. One terminal of the resistor 18 is connected to a junction point P which connects the capacitor 16 and the resistor 17, and the other terminal of the resistor 18 is connected to the base of a transistor 19, whose collector is connected to the relay coil 15 and whose emitter is grounded. Immediately after the starting of the charging of the capacitor 16, the potential at the point P is high enough to turn on the transistor 19. However, the potential on the point P gradually falls as the capacitor 16 is increasingly charged, so that the transistor 19 is turned off after a prescribed time. The prescribed time is set by the timer so that the time lasts from immediately after the starting of the cooling operation of the system to the dewing of the surface of the evaporator if the compressor is driven at maximum capacity.

The circuit 14 for controlling the blower at the time of the starting of the system also includes a manual switch 20, which is provided on a operating panel and can be manually turned on and off. The manual switch 20 is connected between the main switch 11 and the relay coil 15. When the manual switch 20 is open, the relay 15 remains unexcited, regardless of the action of the transistor 19. When the manual switch 20 is closed, the supply of electricity to the relay coil 15 is controlled depending the action of the coil 15. A diode 21 for the absorption of the counter electromotive force is connected in parallel with the relay coil 15.

A circuit 22 for controlling the compressor includes a detection circuit comprising a resistor 23 and a temperature sensor 8 which are connected in series between the main switch 11 and ground, and a series circuit comprising resistors 24 and 25 which are also connected between the main switch and ground. The conjointly coupled point of the temperature sensor 8 and the resistor 23 is connected to a non-inverting input terminal of an operational amplifier 26, and the conjointly coupled point of the resistors 24 is connected to an inverting input terminal of the operational amplifier 26, so that a bridge type temperature comparison circuit is constructed. When the temperature of the the evaporator is higher than a reference level (2° C., for example) which is predetermined by the resistors 24 and 25, the operational amplifier 26 sends out an "H" signal. When the temperature is not higher than the reference level, the operational amplifier 26 sends out an "L" signal. These signals are supplied to the base of a transistor 27, whose collector is connected to the main switch 11 via a second relay coil 28 and whose emitter is grounded. A normally open contact 28a, which is opened and closed by the second relay coil 28, has one terminal connected to the main switch 11 and has the other terminal connected to the positive terminal of the motor 6a of the compressor via a parallel circuit consisting of a normally open contact 15b and a resistor 29 for controlling the r.p.m. of the compressor. The negative terminal of the motor 6a is grounded. The normally open contact 15b is opened and closed by the first relay coil 15. When the normally open contact 28a is closed by energizing the second relay coil 28, the r.p.m. of the motor 6a is controlled depending on opening or closing of the normally open contact 15b so that when the contact 15b is closed, the r.p.m. of the motor 6a is put at the maximum to drive the compressor at the maximum capacity, and when the contact 15b is open, the motor is supplied with electricity via the resistor 29 to make the r.p.m. lower to drive the compressor at a lower capacity. A diode 30 for the absorption of counter electromotive force is connected in parallel with the relay coil 28.

At the first stage of the cooling operation of the system started by connecting the movable contact 9a of the blower switch 9 to a fixed contact other than the OFF contact, and the main switch 11 and the manual switch 20, the potential on the point P of the timer is so high that the transistor 19 is turned on to energize the first relay coil 15 to open the normally closed contact 15a and close the normally open contact 15b. For that reason, the motor 4a of the blower 4 is not supplied with electricity, so that the rotation of the blower remains stopped. At that time, the evaporator 5 is not yet cooled, so that the operational amplifier 26 sends out an "H" signal to turn on the transistor 27 to energize the second relay coil 28 to close the normally open contact 28a. As a result, the maximum voltage is applied to the motor 6a of the compressor 6 to drive it at maximum capacity to quickly lower the temperature of the evaporator 5 to dew it in a short time. When the prescribed time corresponding to the short time has elapsed, the potential on the point P of the timer in the circuit 14 for controlling the blower 4 at the time of the start of the system falls so that the transistor 19 is turned off to de-energize the first relay coil 15 to close the normally closed contact 15a. As a result, electricity is supplied to the motor 4a of the blower 4 to start blowing air. At the same time, the normally open contact 15b is to supply electricity to the motor 6a of the compressor 6 via the resistor 29 to drive the compressor 6 at a lower capacity. After that, the motor 6a is turned on or off depending on the output of the temperature sensor 8.

If the manual switch 20 is open, the normally closed contact 15a remains closed, regardless of the action of the transistor 19, so that the blower 4 is rotated even immediately after the start of the system to enhance its cooling speed although a bad odor is likely to circulate. One of the above-mentioned two cases can thus be manually selected by closing or opening the manual switch 20 depending on the desire of the operator.

Figure 3:
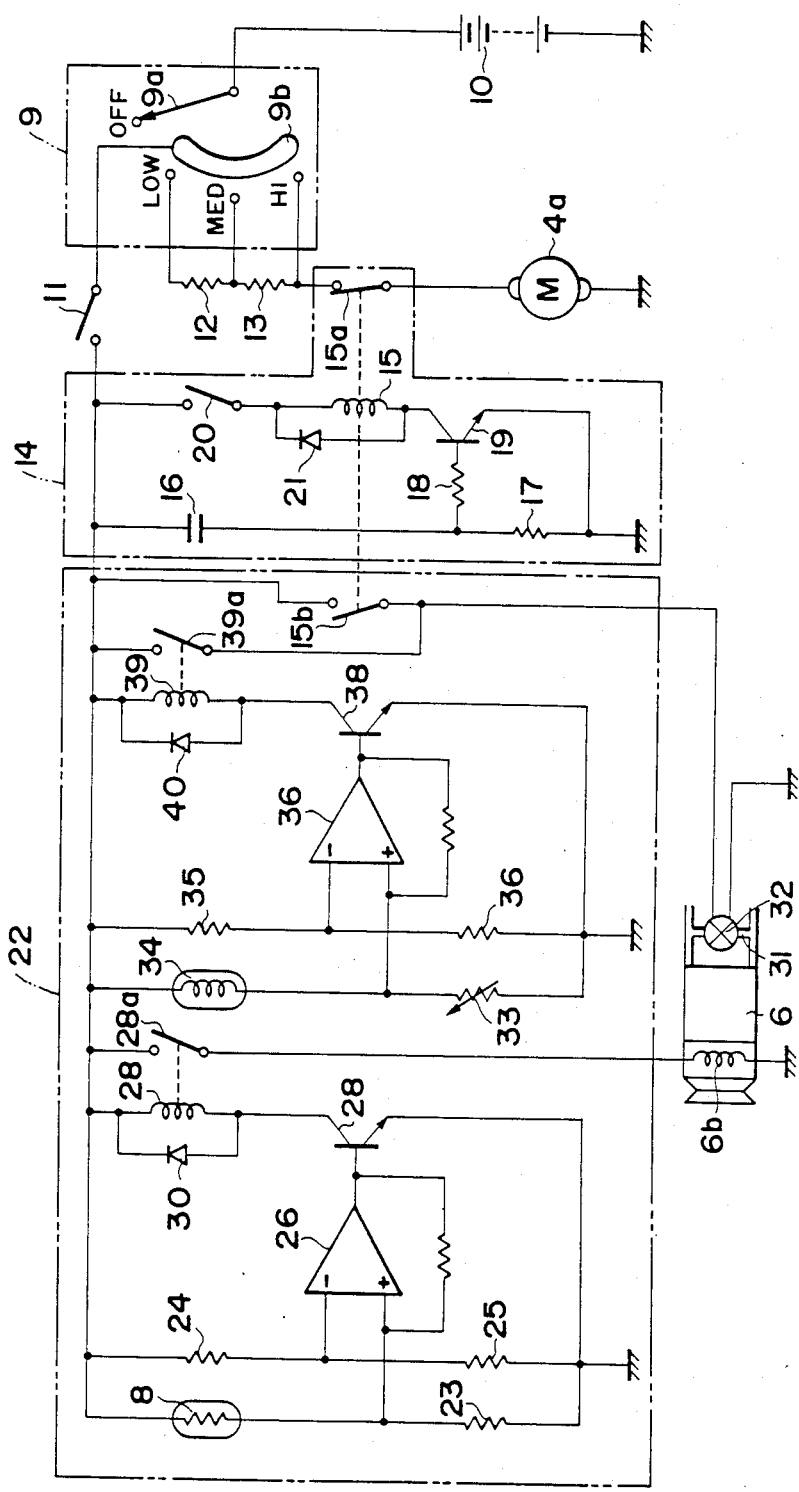
FIG. 3 is an electric circuit of a control circuit which is used in another embodiment of the present invention.

FIG. 3 shows the other embodiment of the present invention, which is appropriate particularly to a cooling system for an automobile. A compressor 6 includes an electromagnetic clutch 6b. The compressor 6 is put into and out of operation by applying and not applying electricity to the electromagnetic clutch 6b. The compressor 6 is provided with a by-pass 31 for connecting the suction port and discharge port of the compressor to each other, and with a solenoid valve 32 in the by-pass 31. When electricity is supplied to the electromagnet of the solenoid valve 32, the valve 32 is closed so that the discharge volume of the compressor becomes a maximum. When no electricity is supplied to the electromagnet of the valve 32, the valve 32 is opened so that the discharge volume of the compressor is decreased. A circuit for controlling the discharge volume of the compressor is connected in parallel with normally open contact 15b, which is opened and closed by a first relay coil 15. In the circuit, a series circuit consisting of a temperature setting device 33 and a room temperature sensor 34 and another series circuit consisting of resistors 35 and 36 are provided between the main switch 11 end ground. The conjointly coupled point of the temperature setting device 33 and the room temperature sensor 34 is connected to a non-inverting input terminal of an operational amplifier 37. The conjointly coupled point of the resistors 35 and 36 is connected to an inverting input terminal of the operational amplifier 37. The output terminal of the amplifier 37 is connected to the base of a transistor 38, whose collector is connected to the main switch 11 via a third relay 39 and whose emitter is ground. A open contact 39a, which is opened and closed by the relay coil 39 is connected in parallel with normally open contact 15b. A diode 40 for the absorption of counter electromotive force is connected in parallel with the third relay coil 39.

When the room temperature detected by the sensor 34 is higher than a prescribed temperature value which is set by the temperature setting device 33, the operational amplifier 37 sends out an "H" signal to turn on the transistor 38 so as to energize the third relay coil 39 to thereby close the normally open contact 39a. As a result, electricity is supplied to the solenoid valve 32 to drive the compressor at a high capacity. If the difference between the detected room temperature and the set temperature is small, the operational amplifier 37 sends out an "L" signal to drive the compressor 6 at such an appropriate capacity as not to cause a loss.

To control the capacity of the compressor without using the above-mentioned two embodiments, the r.p.m. of the compressor may be adjusted by a two-step pulley, or the angle of the swash plate of the compressor, if it is of the swash plate type, may be changed, or the number of effective vanes of the compressor, if it is of the vane type, may be changed, so as to adjust the discharge volume of the compressor. Although the time that takes the evaporator to be dewed is set by the timer in the two embodiments, it may be detected by a temperature sensor or a dew sensor which sense that the evaporator has actually reached a dewing temperature or has been actually dewed.

What is claimed is:

1. A cooling system including a refrigeration cycle having a compressor and an evaporator, and a blower for supplying air to said evaporator of said refrigeration cycle, comprising:
   (a) a means for adjusting for the capacity of said compressor, said compressor having a maximum capacity and a lower normal capacity;
   (b) a means for stopping said blower until said evaporator is substantially dewed after the start of said compressor;
   (c) a means for driving the compressor to maximize the capacity of said compressor under the action of said capacity adjusting means until the stoppage of said blower is nullified under the action of said blower stopping means; and
   (d) a synchronizing means for synchronizing the starting of said blower with the changing of said compressor capacity by said capacity adjusting means from its maximum capacity to its normal capacity.

2. A cooling system according to claim 1, wherein said capacity adjusting means adjusts the r.p.m. of said compressor.

3. A cooling system according to claim 1, wherein said capacity adjusting means adjusts the discharge volume of said compressor.

4. A cooling system according to claim 1, wherein a manual switch is provided for manually nullifying said synchronizing means.

* * * * *